United States Patent
Ziegmann

(10) Patent No.: US 9,426,975 B2
(45) Date of Patent: Aug. 30, 2016

(54) RACCOON TRAP CAP

(76) Inventor: Neil Ziegmann, Lake View, IA (US)

( * ) Notice: Subject to any disclaimer, the term of this patent is extended or adjusted under 35 U.S.C. 154(b) by 475 days.

(21) Appl. No.: 13/556,762

(22) Filed: Jul. 24, 2012

(65) Prior Publication Data

US 2014/0026466 A1 Jan. 30, 2014

(51) Int. Cl.
*A01M 23/34* (2006.01)
*A01M 23/24* (2006.01)

(52) U.S. Cl.
CPC ........... *A01M 23/24* (2013.01); *A01M 23/245* (2013.01); *A01M 23/34* (2013.01)

(58) Field of Classification Search
CPC .................................................. A01M 23/245
USPC ................ 43/58, 61, 77, 81, 85–87
See application file for complete search history.

(56) References Cited

U.S. PATENT DOCUMENTS

| | | | | |
|---|---|---|---|---|
| 129,203 A * | 7/1872 | Merritt | | 43/96 |
| 384,415 A | 6/1888 | Beach | | |
| 1,231,406 A * | 6/1917 | Allen | | 43/96 |
| 1,315,510 A * | 9/1919 | Juricek | | 43/86 |
| 4,158,929 A | 6/1979 | Custard | | |
| 4,341,033 A | 7/1982 | Siegel | | |
| 4,601,128 A | 7/1986 | Danison | | |
| 4,633,610 A | 1/1987 | Thompson | | |
| 4,735,011 A * | 4/1988 | Spillett | | 43/86 |
| 4,802,301 A | 2/1989 | Isborn et al. | | |
| 5,175,957 A * | 1/1993 | West | | 43/61 |
| 6,658,787 B1 * | 12/2003 | Bonnot | | 43/58 |
| 8,230,642 B2 * | 7/2012 | Ziegmann | | 43/85 |
| 8,371,062 B2 * | 2/2013 | Ziegmann | | 43/61 |
| 2005/0274057 A1 * | 12/2005 | McCulloch | | 43/85 |
| 2010/0275503 A1 * | 11/2010 | Ziegmann | | 43/85 |
| 2011/0271583 A1 * | 11/2011 | Sturgeon et al. | | 43/85 |
| 2011/0289821 A1 * | 12/2011 | Bonnot | | 43/86 |
| 2012/0060405 A1 * | 3/2012 | Stephens | | 43/85 |
| 2012/0180377 A1 * | 7/2012 | Ziegmann | | 43/58 |

OTHER PUBLICATIONS

Rule 56 Declaration of Neil P. Ziegmann, Mar. 5, 2014, 2 pages.

* cited by examiner

*Primary Examiner* — Darren W Ark
*Assistant Examiner* — Morgan T Barlow
(74) *Attorney, Agent, or Firm* — McKee, Voorhees & Sease, PLC

(57) ABSTRACT

A cap is provided for a tubular raccoon trap. The cap fits in the open upper end of the set and baited trap to keep mice and other small animals stealing the bait in the trap. A raccoon can easily remove the cap for access to the bait, to thereby trip the trigger and be caught in the trap.

21 Claims, 3 Drawing Sheets

RACCOON TRAP CAP

BACKGROUND OF THE INVENTION

Various types of traps have been commercially available for many years for use by fur trappers, such as raccoon traps. One of the most common types of raccoon traps includes a tubular body in which bait is inserted, with a trigger which is set and then tripped by a raccoon's paw when the raccoon tries to withdraw the bait from the tubular body. The trigger is tripped only in one direction, when the paw is being pulled out of the tubular housing. For example, see U.S. Pat. No. 6,658,787 (Bonnot) for a spring-loaded trap with a one-way trigger. When the trigger is tripped, a spring biased clamp traps the raccoon's leg before the paw is withdrawn from the housing. This type of trap is more humane to the animal, and causes little or no injury to the animal. However, some raccoons escape the trap without setting off the trigger, due to the one-way action of the trigger. Also, the wire loop anchor of the Bonnot trap cannot be pushed into hard or frozen ground, and cannot be anchored in a tree, wooden post or other solid structure. The Bonnot trap also cannot be used in water since the anchor is too short. Applicants co-pending patent application U.S. Ser. No. 12/773,303 filed on May 4, 2010 and entitled RACCOON TRAP addresses these deficiencies of conventional raccoon traps, and is incorporated herein by reference.

Another problem with conventional traps is that the opened end of the trap allows small animals, particularly mice, to enter a trap and steal the bait, without tripping the trigger. It is virtually impossible for a trapper to see from a distance, for example driving by the traps, whether the bait remains in a set trap. Rather, the trapper must look directly into the opened end of the tubular body to inspect the bait. If the bait has been stolen by a mouse or other small animal, the unbaited trap will not attract a raccoon.

Therefore, a primary objective of the present invention is the provision of an improved animal trap having a removable cap to preclude bait from being stolen.

Another objective of the present invention is the provision of a raccoon trap cap which prevents a mouse or other small animals from entering the trap body to access the bait.

A further objective of the present invention is the provision of a raccoon trap cap which loosely fits over the open end of the trap body and can be easily removed by a raccoon seeking the bait inside the trap body.

Another objective of the present invention is the provision of an animal trap cap having a grip portion which an animal can use for removing the cap from the trap body.

Still another objective of the present invention is the provision of a raccoon trap cap having vent holes to allow bait aroma to escape from the trap body.

These and other objectives of the present invention will become apparent from the following description of the invention.

SUMMARY OF THE INVENTION

A removable cap is provided for a raccoon trap to prevent mice and other small animals from entering the trap to steal the bait. The trap includes a hollow body with a spring loaded trigger. Bait is placed inside the body and then the trap is set so that when a raccoon reaches its paw into the housing to get the bait, the trigger will be tripped and the spring will catch the raccoon in the trap. The cap of the present invention is loosely set into the open end of the trap after the trap has been baited and set. The cap has a tubular body without an outside diameter less than the inside diameter of the trap body, and a top having a diameter greater than the inside diameter of the trap body, such that the cap will sit on top of the trap body. The cap includes a grip portion, such as a wire ring, which the raccoon can manipulate to remove the cap from the body to gain access to the bait and thereby trip the trigger to catch the raccoon in the trap.

DESCRIPTION OF THE PREFERRED EMBODIMENT

Figure 2:
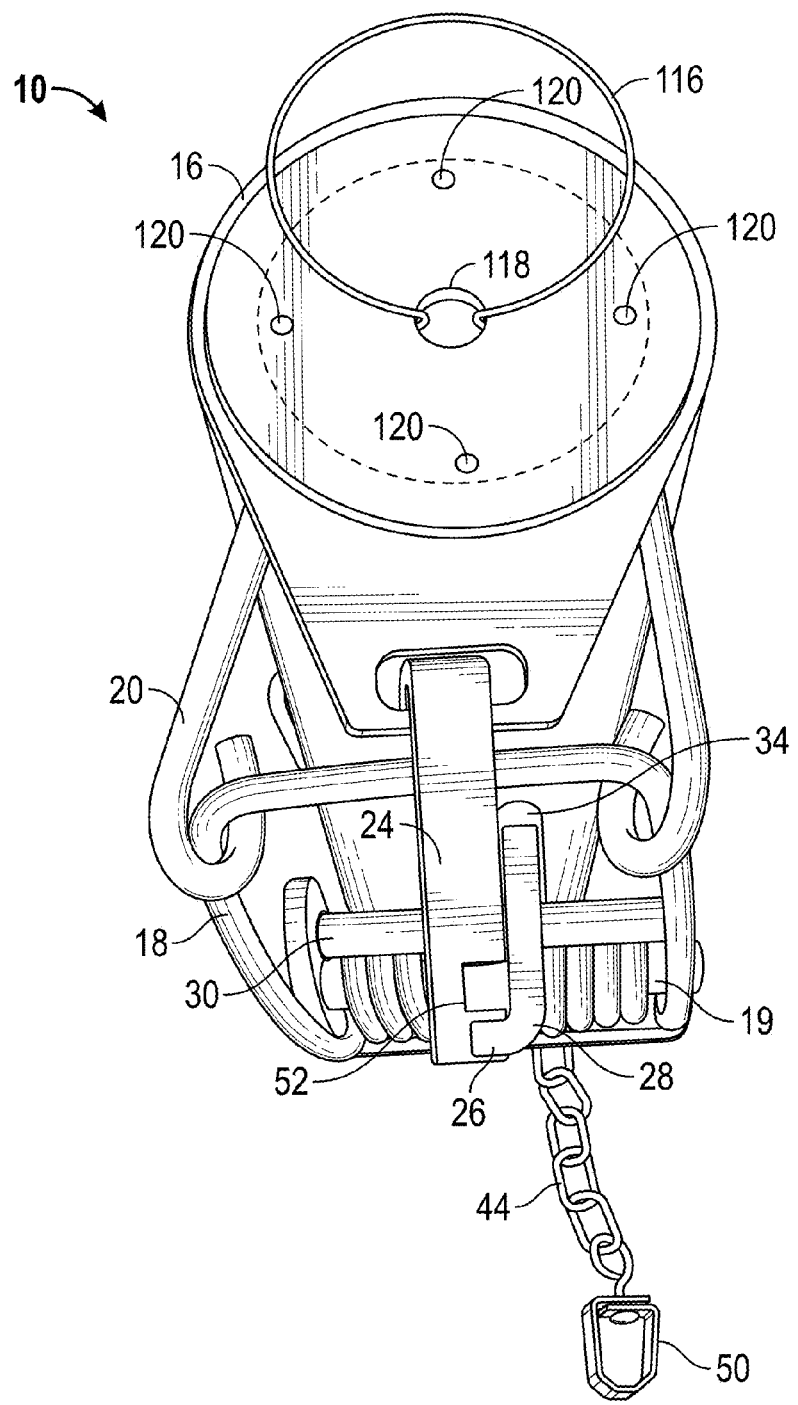
FIG. 2 is a perspective view of the raccoon trap with the removable cap mounted therein.
Figure 3:
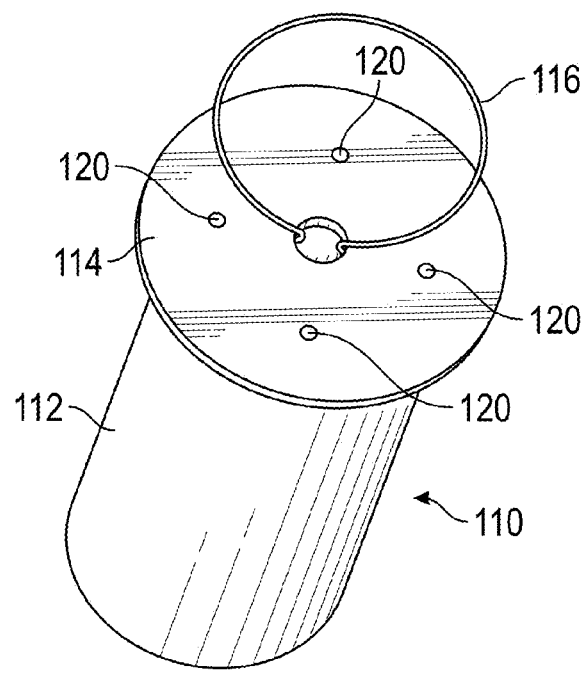
FIG. 3 is a perspective view of the cap.
Figure 4:
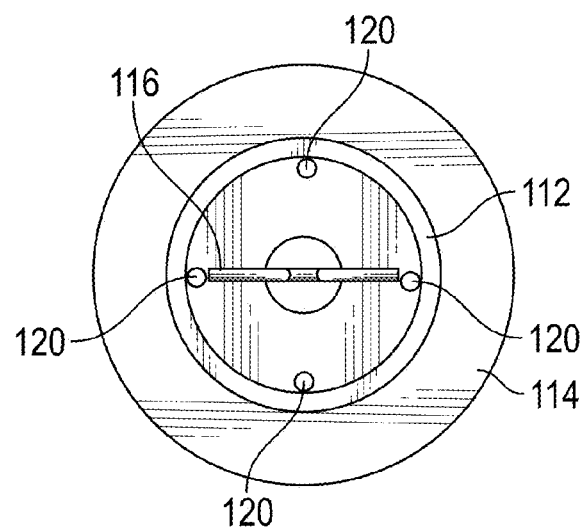
FIG. 4 is a bottom plan view of the cap.

The trap 10 of the present invention includes a tubular body or housing 12 which is closed at the rear end 14 and opened at the front end 16. The trap 10 includes an animal paw restraint formed by a spring-loaded wire frame 18 with a U-shaped arm loop 20 extending through a pair slots 22 at the forward end 16 of the tube 12 so that the lower end of the arm 20 is movable across the diameter of the tube. The wire frame 18 is pivotally mounted on an axle 19 at the rear end 14 of the tube 12, such that the arm 20 is movable between a set or open position and a released or closed position. A spring 21 on the housing 12 biases the wire frame 18 to the released position. An elongated latch 24 is pivotally mounted adjacent the front end 16 of the tubular housing 12 so as to be movable between a first position engaging the wire frame 18 to hold the wire frame 18 and arm 20 in the set position, and a second position disengaged from the wire frame 18 so as to release the frame 18 and arm 20 from the set position. In the set position, the latch 24 overlies the wire frame 18 and is secured by a hook 26 on the upper end of the trigger 28 of the trap 10. The trigger 28 is pivotally mounted on a cross bar 30 on the outside of the housing 12 and extends into the housing 12 through a slot 34 in the housing 12. As best seen in FIG. 2, the hook 26 on the upper end of the trigger 28 extends laterally and overlies the rear end or tip of the latch 24, and thereby prevents the latch 24 from disengaging the wire frame 18, and thereby maintaining the wire frame 18 and arm 20 in the set position.

Figure 1:
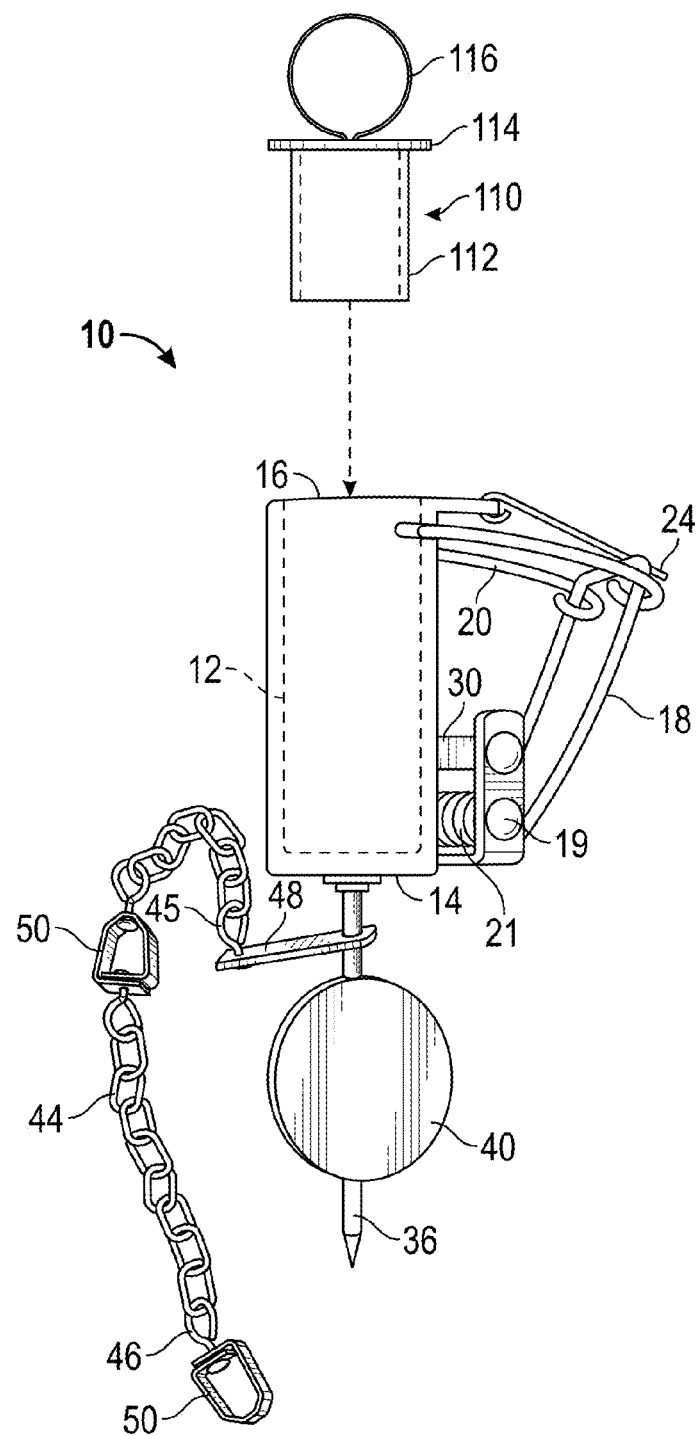
FIG. 1 is an exploded side elevation view of a raccoon trap with the cap of the present invention.

The preferred form of a trap anchor is shown in FIG. 1 wherein the anchor is formed by a ¼" cold rolled steel stake 36 having a sharp point on the end which can be pushed into hard or frozen ground, and can be nailed or pushed into a tree, bridge piling, or other solid structure. The pointed steel stake 36 can be attached to a longer wooden stake with a hole in the top end to receive the steel stake 36. Thus, the wooden stake extends the length of the trap anchor 36 so that the trap 10 can be used in water, such as a creek or river, with the wooden stake being pushed into the creek or river bed, with the housing 12 residing above the water so that the bait in the housing does not get wet. As further shown in FIG. 1, a round washer or plate 40 is welded to the steel stake 36 so as to keep the trap 10 stable, and prevent turning or rotation of the trap 10 when the anchor 36 is set in sand, mud or loose dirt.

An alternative anchor for the housing 12 is in the form of a U-shaped wire-type anchor (not shown) at the rear end 14 which is pushed into the ground and then rotated 90° to retain the trap 10 in the ground. Another form of the anchor is a rod (not shown) welded to the tubular housing and extending downwardly, with a wire or plate member at the lower end to prevent rotation of the trap. The plate may be any shape, such as an inverted triangle, which facilitates insertion into the ground.

A chain 44 is connected to the anchor with the opposite free end 46 staked to the ground or other object to further secure the trap 10 against movement by an animal caught in the trap 10. The round or curved perimeter edge of the washer or plate 40 on the stake 36 prevents the chain 44 from becoming tangled or caught on the stake 36. Once an animal is caught in the trap 10, it is desired that the animal be able to pull the stabilizing stake 36, 42 out of the ground or wood, but still be controlled by the anchor at the far end 46 of the chain 44. The goal is to keep the trapped animal as comfortable as possible. With this type of leg trap 10, and without chain entanglement, the raccoon may even be found sleeping with the trap 10 on its foot when the trap is checked by the trapper.

The first end 45 of the chain 44 is preferably connected to the trap 10 via a flat steel bar 48 which freely rotates on the steel stake 36 above the plate 40. The first end 45 of the chain 44 is riveted or connected to the bar 48 for rotation. The chain 44 may include multiple sections connected by a swivel 50, as well as a swivel 50 at the second end 46 of the chain 44. Thus, there are multiple pivot or swivel points between the trap anchor 36, 42 and the far end 46 of the chain 44 to preclude twisting or entanglement of the chain 44.

In use, bait, such as a marshmallow, candy or other sweetened food can be inserted into the tubular housing 12 behind the trigger 28 before the trap 10 is set. The bait may also be very small pieces or a liquid which can be poured into the housing after the trap 10 is anchored and the trap is set. After the trap 10 is set, the anchor 36, 42 can be pushed into the ground. When the animal, such as a raccoon, reaches its paw into the trap 10 to get the bait, if the trigger leg 32 is pushed rearwardly by the raccoon's paw, the hook 26 on the upper end will move or pivot forwardly and disengage the latch 24 via a notch 52 in the latch 24, as seen in FIG. 2. Alternatively, if the raccoon's paw gets behind the trigger leg 32 and then pulls the leg 32 forwardly, the hook 26 at the upper end of the trigger 28 will pivot rearwardly and disengage the end of the latch 24. When the trigger hook 26 disengages the latch 24, the spring 21 quickly forces the wire frame 18 upwardly, thereby pulling the wire arm 20 toward the closed position and trapping engagement with the raccoon's leg, so that the raccoon cannot escape from the trap 10.

Thus, the two-way acting trigger 28 can be moved both forwardly and rearwardly by the animal's paw to disengage the latch 24 and trip the trap 10 so as to catch the raccoon in the trap 10. The anchor chain 44 of the trap 10 holds the trap 10 until the trapper returns.

The trap cap of the present invention is designated by the reference numeral 110 in the drawings. The cap 110 can be used on the two-way acting trap 10 described above and shown in FIGS. 1 and 2, or on a conventional one-way trigger trap such as that disclosed in U.S. Pat. No. 6,658,787 and as disclosed in Applicant's co-pending application Ser. No. 12/773,303.

The cap 110 includes a body 112, which preferably is a cylindrical tube, but alternatively can be a solid member. A top 114 is provided on the body 12, with a grip portion 116 connected to the top 114 of the cap 110. In the drawings, the grip portion 116 is shown to be a wire loop with opposite ends extending through a central hole 118 in the top 114 of the cap 110. It is understood that the grip portion 118 may take other forms and shapes and be connected to the top 114 in other ways without departing from the scope of the present invention. For example, a grip can be formed integrally with the top 114 or can be welded thereto. The top 114 also may have one or more vent holes 120 which allow the bait aroma to escape the trap body 12 to attract a raccoon.

The cap body 112 fits loosely into the opened end 16 of the trap 10. The outside diameter of the body 112 is less than the inside diameter of the trap body 16. The diameter of the cap 114 is greater than the inside diameter of the trap body 16, and preferably is approximately the same diameter as the outside diameter of the trap body 12. Thus, the cap 110 sits loosely on top of the trap body 12.

The cap 110 is placed on the trap body 12 after the trap 10 is baited and set and the stake 36 is inserted into the ground or other object to hold the trap 10 in a substantially upright position. The cap 110 cannot be removed by a mouse or other small animal, and thus prevents such small animals from getting into the trap body 12 and stealing the bait. However, a raccoon, which has substantial dexterity in its paws, can easily remove the cap 110 from the trap body 12 by manipulating the grip portion 116. Alternatively, the raccoon can insert a toenail into one of the holes in the top 114 of the cap 110 and pull the cap 110 out of the trap body 12. The loose fit of the cap body 112 in the trap body 12 permits easy removal of the cap 110 by a raccoon. Then, the raccoon can access the bait and trip the trigger and thereby be caught by the trap 10.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. An animal paw trap for capturing an animal by its paw, comprising:

an upright housing having a sidewall, a closed bottom, and an open top into which an animal can reach its paw but not its head;

a spring loaded restraint mounted on the housing and movable between set and unset positions;

a latch pivotally mounted on the housing movable between set and unset positions;

a trigger pivotally mounted on the housing and extending into the housing;

the restraint being moved to the set position and the latch being moved to the set position for engagement by the trigger to maintain the latch and the restraint in the set positions;

the trigger being movable by the animal's paw by reaching through the open top while the animal's head is outside the housing to disengage the trigger from the latch, and thereby release the latch and the restraint from the set positions, whereby the paw is caught in the housing by the restraint while the animal's head is outside the housing; and a cap having a lower end slidably and removably mounted into the open top of the housing after bait is placed in the housing and the restraint is moved to the set position, and having an upper end covering at least a portion of the housing to substantially close the top of the housing and thereby keep mice from crawling into the housing after the restraint and latch are set;

the cap being removable by the animal to expose the open top and then allow the animal to reach its paw through the open top to move the trigger;

wherein the cap includes at least one aperture to allow aroma from a bait in the housing to escape the housing; and the trigger moveable by the animal only after the cap is removed.

2. The animal paw trap of claim 1 wherein the cap has a body with an outside diameter smaller than the inside diameter of the housing and a top with an outside diameter greater than the housing inside diameter.

3. The animal paw trap of claim 1 wherein the cap has a grip portion for removing the cap from the housing.

4. The animal paw trap of claim 3 wherein the grip portion is a ring.

5. The animal paw trap of claim 1 wherein the cap has a body and a top, and the at least one aperture is in the top.

6. The animal paw trap of claim 5 wherein the body of the cap is hollow.

7. The animal paw trap of claim 1 wherein the cap fits loosely into the housing.

8. The animal paw trap of claim 1 wherein the cap is retained in the housing only by gravity.

9. The animal paw trap of claim 1 wherein the cap covers the open forward end of the housing.

10. The animal trap of claim 1 wherein the restraint clamps the animal's paw against the housing.

11. An animal paw trap for capturing an animal by its paw, comprising:
   a tubular body with a closed bottom end and an open top end into which an animal can reach its paw without walking into the body;
   a spring loaded restraint mounted on the body movable between open and closed positions;
   a latch on the body to selectively engage the restraint;
   a trigger on the body to engage the latch so as to hold the restraint in the open position; and
   the trigger being movable by an animal reaching its paw through the open top and into the body without walking into the body and thereby disengaging the latch so as to release the restraint from the open position to the closed position to catch the animal's paw in the body;
   a cap slidably mounted into the open top end of the body after the restraint is moved to the open position to substantially cover the open end and the cap being removable by the animal to expose the open end for access to bait and to the trigger inside the housing;
   the cap having a base insertable into the tubular body and a substantially closed top extending across the base, such that the top closes the open top end of the body and precludes access to the trigger while the cap is on the housing; and
   wherein the cap must be removed before the animal can move the trigger.

12. The paw trap of claim 10 wherein the cap has a grip portion for removing the cap from the housing.

13. The paw trap of claim 10 wherein the base of the cap is hollow.

14. The paw trap of claim 10 wherein the top of the cap has at least one hole to vent bait aroma from the housing.

15. The paw trap of claim 10 wherein the cap fits loosely into the housing.

16. The trap of claim 10 wherein the restraint clamps the animal's paw against the housing.

17. A live animal paw trap for catching an animal by its paw, comprising:
   a housing having an open upper end smaller than the animals he and large enough to receive the animal's paw;
   a latch on the housing;
   a restraint on the housing;
   a trigger on the housing;
   the latch being engageable with the restraint and the trigger being engageable with the latch to hold the trap in a set position;
   the trigger being movable by the animal's paw reaching into the housing without the animal's head entering the housing to disengage the latch and thereby release the restraint from the set position to catch the animal's paw; and
   a cap having a lower body slidably and removably mounted into the open upper end of the housing and a top extending across the body to block the open upper end of the housing after the trap is in the set position; and
   the cap being removable from the housing by the animal to unblock the open upper end before the animal reaches its paw into the housing to move the trigger therein; and
   wherein the trigger is moveable by the animal only after the cap is removed.

18. The live trap of claim 17 wherein the cap includes a body extending loosely into the housing.

19. The live trap of claim 17 wherein the cap has a grip portion for removing the cap from the housing.

20. The live trap of claim 17 wherein the cap includes an aperture to allow aroma from bait in the housing to escape the housing.

21. The live trap of claim 17 wherein the restraint clamps the animal's paw against the body.

* * * * *